Jan. 23, 1945.  F. S. GROVER  2,367,839
BUFFING MACHINE FOR RUBBER-LIKE MATERIALS
Filed Sept. 13, 1943
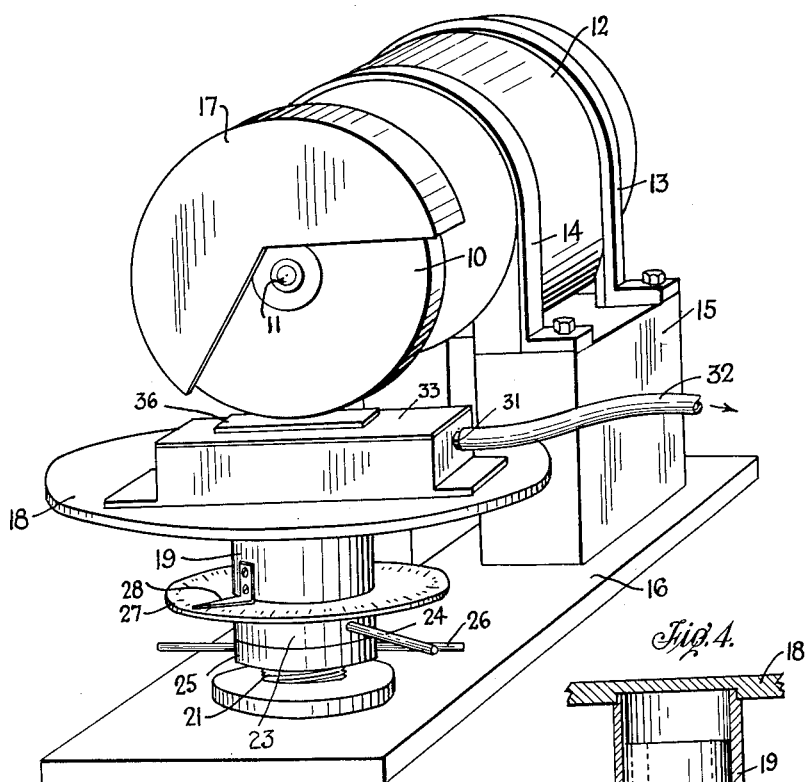
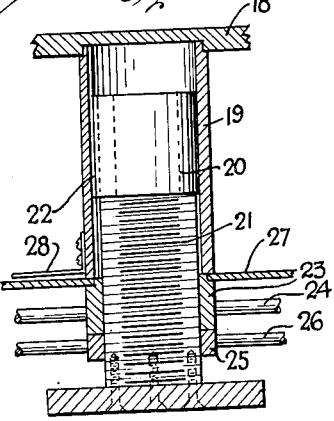
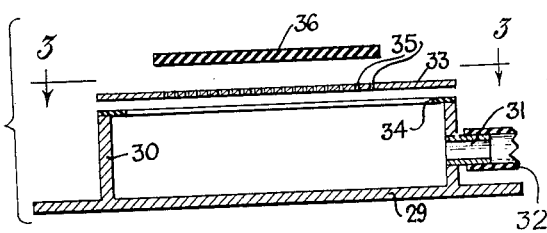
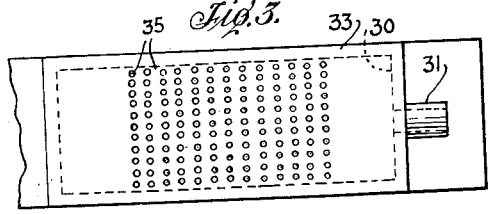
Inventor
FRANK S GROVER
By Ely & Frye
Attorneys Patented Jan. 23, 1945

2,367,839

UNITED STATES PATENT OFFICE 2,367,839

BUFFING MACHINE FOR RUBBERLIKE MATERIALS

Frank S. Grover, Akron, Ohio, assignor to The Firestone Tire & Rubber Company, Akron, Ohio, a corporation of Ohio Application September 13, 1943, Serial No. 502,384

4 Claims. (Cl. 51—91)

This application involves an invention in machines for buffing or grinding the surface of materials such as rubber. The case is more specifically concerned with that combination which includes holding means for the rubber or other non-rigid material to be worked upon. Due to the fact that non-rigid types of material, of which rubber is merely an example, will not retain their shape when clamped, and since they are not adapted to be held magnetically, considerable difficulty has been experienced in machining specimens of materials of this particular class.

It is generally desirable to hold a rubber-like specimen in such a manner that it may be ground or buffed with a degree of accuracy comparable to that obtained when machining iron or steel or other rigid materials which may very easily be clamped or otherwise retained in a definite predetermined relationship to a grinding wheel or other tool for working on them. The invention herein described makes it possible to hold blocks or other specimens of rubber rigidly in position without the specimen being deflected out of alignment or buckling as is commonly experienced if a specimen is clamped, especially when the same is of relatively thin section. As a matter of fact, it is virtually impossible to clamp such materials unless they are of considerable thickness, and even then a clamping action will distort the material so that accuracy cannot be maintained.

According to the invention, a work supporting table or other mechanism for the purpose is adjustably positioned adjacent a buffing or grinding wheel, or other tool, and presents a smooth surface upon which a work holder may be supported and moved in any desired direction so as to buff or grind the surface of material retained thereon. The work holder is especially constructed to retain the rubber-like specimen and includes a vacuum chamber having a connection to a vacuum line and being provided with a cover and gasket by means of which the chamber is closed when the specimen is in place. The cover to the chamber and the chamber itself are provided with parallel upper and lower surfaces so that a specimen may be held in proper relationship to the tool and will be machined in true parallel relationship as the holder is moved upon the support.

The cover to the chamber is provided with a plurality of small openings, these openings covering an area which is similar in shape to, but slightly smaller than, the area of the rubber-like specimen to be held. When the specimen is mounted to close the plurality of openings, the chamber is rendered virtually air-tight and atmospheric pressure will be evacuated therefrom. The vacuum created will hold the cover in place on the chamber and will also maintain the specimen in its proper position during traversing beneath the grinding wheel or other tool. Since the rubber-like specimen is held on a truly flat surface which is geometrically correctly disposed for movement relatively to the tool, and since the lines of force holding the specimen in position have no tendency to distort it, it may be machined at any desired angle or in parallelism and to very close limits. Such specimens of rubber are especially adapted to be tested and results of tests upon specimens brought to size by this mechanism are much more accurate than would be the case if they had been prepared in any other way.

The invention is described with respect to a preferred embodiment thereof which has been illustrated in the accompanying figures of drawing in which:

Fig. 1 is an isometric view showing a grinding or buffing wheel, a work support and a work holder with a specimen in place about to be machined;

Fig. 2 is a sectional view through the work holder;

Fig. 3 is a plan view of the work holder shown in Fig. 2 with the specimen removed; and Fig. 4 is a sectional view through the work support illustrating the manner in which the same is adjusted to and from the grinding wheel.

Referring to Fig. 1, a complete unit is illustrated in which a grinding or buffing wheel 10 is fixed for rotation on a spindle 11 which is in fact an extension of the armature shaft of a motor 12. This motor is maintained rigidly in position by straps 13 and 14 attached to a block 15 mounted on and which raises the motor from the base 16. The motor is connected to any suitable source of current and is adapted to drive the wheel 10 at an appropriate speed. The wheel has a guard 17 for protection of the operator. It is to be understood that the wheel 10 may be a grinding wheel such as an emery wheel or may be some other type of tool such as a buffing wheel for polishing. While the invention is described with respect to treatment of a rubber or rubber-like specimen, it is to be understood that treatment of similar materials is contemplated and the mechanism is adapted to use in any situation wherein it may be found advantageous.

Whenever the term "rubber-like material" is employed, the inclusion of other and similar materials is to be understood.

A work supporting table 18 having a top surface which has been ground to present a smooth plane is fixed to a sleeve 19 vertically movable upon mechanism and by means of an adjustment more clearly shown in Fig. 4. While the table 18 is moved vertically, it is maintained in proper alignment to the wheel so that specimens may be ground in true parallel sided or other desired relationship. The base 16 has attached thereto a flanged tubular guide 20 which is turned to a smaller diameter and is threaded for about two-thirds its length at the lower end 21. A keyway is cut in the sleeve 19 and carries a key 22 which also engages within a corresponding keyway in the upper end of the tube 20. This key prevents relative rotation between table 18 and the base 16 yet allows it to be moved vertically to and from the wheel 10 to adapt its height to treatment of specimens of different thicknesses and also for the purpose of moving the same toward the wheel in measured increments as when taking successive cuts on the specimen.

A ring 23 is threaded to engage the threaded part 21 of the tube. This ring has handles 24 by means of which it is turned as when adjusting the height of the table. A second ring 25 having operating handles 26 serves to clamp or lock the ring 23 in position. The ring 23 also carries a graduated disk 27 which in cooperation with a pointer 28 indicates to the operator of the device the number of thousandths of an inch or other desired increment through which he has moved the table to or from the wheel. The pointer 28 is fixed to sleeve 19 and the disk 27 rotates beneath the pointer as the adjustment is effected.

Now referring to Figs. 2 and 3, the work holder comprises a box-like structure or vacuum chamber having a base 29, sides 30 and a tubular connection 31 which is for the purpose of receiving the end of a piece of rubber tubing 32 or other connection to a vacuum line. A work-holding cover 33 fits above the sides 30 of the vacuum chamber and engages a gasket 34 which is preferably of rubber so that, except for a plurality of relatively fine openings 35, the chamber will be air-tight when assembled. A specimen of rubber-like material is shown at 36 and when in position to cover the openings 35, will render the entire chamber air-tight so that a vacuum will exist in the chamber under the influence of evacuation effected through the line 32.

Different covers 33 are available, these covers having the openings 35 arranged in differently shaped areas, for example, to accommodate rectangular specimens or circular specimens. Any other shape or different sizes of specimens may be taken care of by use of an appropriate cover. Of course, the rubber-like material worked upon must be provided with a flat surface for initial engagement with the cover 33 and also must not be of a porous nature. The use of the rubber gasket 34 enables the covers 33 to have sealing engagement with the top of the vacuum box without being secured thereto by screws or other means, the suction within the box being sufficient to retain the covers in place notwithstanding the force applied thereto by reason of the abrading wheel 10. The arrangement enables the substitution of one cover for another easily and quickly to be made.

In operation of the device, a specimen is placed on the cover which is engaged on the chamber with the gasket 34 properly placed between, and the vacuum line is connected up so that atmospheric pressure is replaced by a vacuum in the chamber. The table 18 is then elevated to such a height that the specimen will be engaged by the wheel, the ring 23 being rotated for that purpose and being locked in position by threaded ring 25 to maintain the table rigidly in position while the specimen is being machined. The specimen may be removed and measured at any time, or a gauge may be employed and by successive raising of the table 18 throughout increments determined by the depth of cut to be taken by the tool, the specimen may eventually be brought to any desired thickness. It is possible to treat exceedingly thin specimens and arrive at a truly parallel sided product having the desired thickness with perfectly smooth surfaces, that being something heretofore virtually impossible of attainment. By employing the pointer and graduated disk 27, a cut of any desired dimension may be properly gauged. For example, if the specimen has been brought down to within .003" of size, raising the table .003" according to the pointer and disk, will present the specimen in such manner as to allow the grinding of just enough material from its surface to leave it in the exact thickness desired.

In the embodiment of the invention disclosed traversing of the specimen beneath the wheel is to be accomplished by manually moving the vacuum box over the table 18, this being possible by reason of the flexible connection 32 with the source of suction. This enables the work-specimen always to be moved counter to the movement of the buffing wheel 10, which procedure has been found to give superior results. Of course, the table 18 may be so designed as to be a part of a mechanically traversed means which will move the work to and fro relatively to the wheel thereby rendering the mechanism more automatic in its operation. If it is desired to grind a specimen with a taper or in some other non-parallel relationship, the table 18 may be arranged for tilting in any of the well-known manners and the work properly guided to move along the tilted table thereby presenting the work to the wheel so that any desired angular relationship may be maintained between the upper and lower surfaces of a specimen. Accordingly, the chamber may be so constructed and the cooperating cover such as the cover 33 may be formed of different shapes so that circular specimens may be held, or in fact, the motion of the device may be altered so that the surface to be ground or otherwise machined may be other than flat. By altering the shape of the work holder or by varying and controlling the movement of the table upon which the work holder is supported, profiles of almost any desired configuration may result.

The invention has been described in more or less specific terms, but that is for purposes of illustration only and it is to be understood that variations may be resorted to without departing from the scope of the invention as originally conceived and as defined in the appended claims.

I claim:

1. A machine for buffing rubber-like specimens including in combination a support operatively associated with a buffing wheel, a vacuum chamber resting on said support and manually slidable freely thereover a flexible connection from said chamber to a vacuum line, a perforated plate covering said vacuum chamber and a gasket between the chamber and plate.

2. A machine for buffing rubber-like specimens including in combination a buffing wheel, a work support associated with said wheel and adjustable to and from the wheel, a holder for the specimen including a vacuum chamber resting on the support and manually movable freely thereover, a flexible connection from said chamber to a vacuum line, a perforated plate covering the chamber, and a gasket between the plate and the wall of the chamber so that when a specimen is mounted on the plate and covering the perforated portion thereof, the specimen and the plate will be held in place by differential pressure as air is evacuated from the chamber.

3. A machine for buffing rubber-like specimens including in combination a buffing wheel, a support associated in operative work supporting relation to said wheel and being constructed for adjustment to vary the distance between the work support and the wheel, a holder for the specimen including a vacuum chamber resting on the support and manually movable freely thereover, a flexible connection from said chamber to a vacuum line, an unattached perforated plate covering the chamber, and a gasket between the plate and chamber so that when a specimen is mounted on the plate and covering the perforated portion thereof, the specimen and the cover will be held in place solely by differential air pressure as air is evacuated from the chamber.

4. In a device for removing material from the surface of a non-porous, non-rigid specimen, a holder for the specimen consisting of a vacuum box, an unattached cover therefor formed with a plurality of apertures therein, and a gasket positionable between the upper margin of the vacuum box and said cover, whereby when a specimen is mounted on said cover over the apertures therein the specimen and cover will be retained in place by differential fluid pressure as air is evacuated from the vacuum box.

FRANK S. GROVER.